United States Patent [19]
Van't Sant et al.

[11] 3,989,489
[45] Nov. 2, 1976

[54] CENTRIFUGAL APPARATUS FOR GAS/LIQUID SEPARATION

[75] Inventors: Willem C. Van't Sant; Alfred L. Van Kleef, both of The Hague, Netherlands

[73] Assignee: Shell Oil Company, Houston, Tex.

[22] Filed: Aug. 4, 1975

[21] Appl. No.: 601,964

[52] U.S. Cl. .................................. 55/338; 55/458; 55/461; 55/466
[51] Int. Cl.² ...................................... B01D 45/12
[58] Field of Search ............ 55/447, 456, 457, 461, 55/1, 458, 466, 338, 339, 342, 345

[56] References Cited
UNITED STATES PATENTS
3,884,660  5/1975  Perry, Jr. et al. .................... 55/339

FOREIGN PATENTS OR APPLICATIONS
345,233  12/1921  Germany .............................. 55/461
628,212  8/1949  United Kingdom .................... 55/338

*Primary Examiner*—Bernard Nozick

[57] ABSTRACT

An apparatus for separating liquid particles from a gas-stream by passing the gas stream through a curved tube so that the liquid is caused to concentrate along the inner surface of the outer wall of the curved tube. The concentrated liquid together with some gas is passed to a liquid collecting chamber. The liquid is drained from the liquid collecting chamber and the gas is returned from the liquid collecting chamber to the main stream.

3 Claims, 6 Drawing Figures

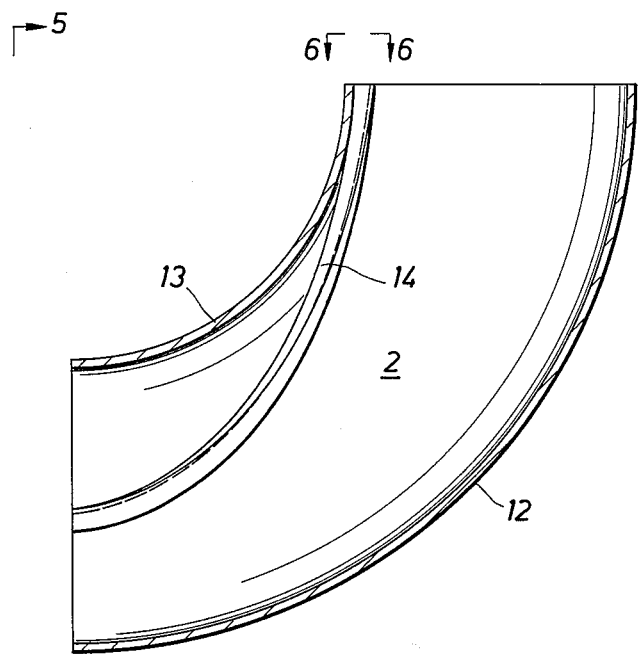
FIG. 4
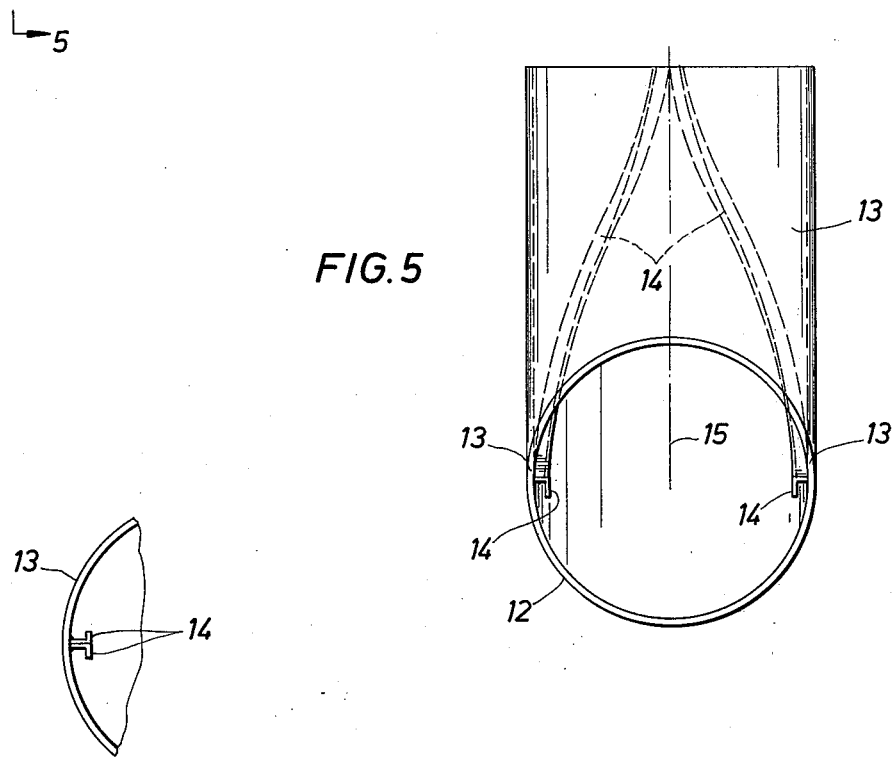
FIG. 5
FIG. 6

CENTRIFUGAL APPARATUS FOR GAS/LIQUID SEPARATION

BACKGROUND OF THE INVENTION

It is often necessary to separate liquid from a stream of fluid consisting of a gas carrying liquid particles, which is flowing through a conduit. It is an object of the invention to provide an inexpensive and compact separator for separating liquid from such a stream of fluid, flowing through a conduit.

SUMMARY OF THE INVENTION

The method according to the use of apparatus comprises passing a fluid, consisting of a gas carrying liquid particles, as a main stream through a tubular fluid channel having a curved part so that liquid is caused to concentrate along the inner surface of the outer wall of the curved part, removing the concentrated liquid together with some gas from the main stream at a location near the downstream end of the curved part and passing it to a liquid collecting chamber, draining the liquid from the liquid collecting chamber and returning the gas from the liquid collecting chamber to the main stream.

The gas/liquid separator according to the invention comprises a tubular fluid channel having a curved part, a liquid collecting chamber, a liquid outlet between the tubular fluid channel and the liquid collecting chamber, a liquid discharge secured to the liquid collecting chamber and the tubular fluid channel, the liquid outlet being arranged near the downstream end of the curved part.

In a suitable embodiment of the gas/liquid separator according to the invention, the liquid outlet is located mainly at the side of the outer wall of the curved part and the gas discharge is located mainly at the side of the inner wall of the curved part.

In a preferred embodiment of the gas/liquid separator according to the invention, the liquid outlet is in the shape of a slit.

Important advantages of the gas/liquid separator according to the invention are that it occupies little space and that it can be easily mounted in a conduit.

BRIEF DESCRIPTION OF THE DRAWING

The invention will be further explained with reference to the drawings, wherein:

FIG. 4 shows a longitudinal section of the curved part of the tubular fluid conduit of the separator according to the invention;

FIG. 5 shows a side view of 5—5 of the curved part according to FIG. 4;

FIG. 6 shows a side view 6—6 of a fragment of the curved part according to FIG. 4.

DESCRIPTION OF A PREFERRED EMBODIMENT

Figure 1:
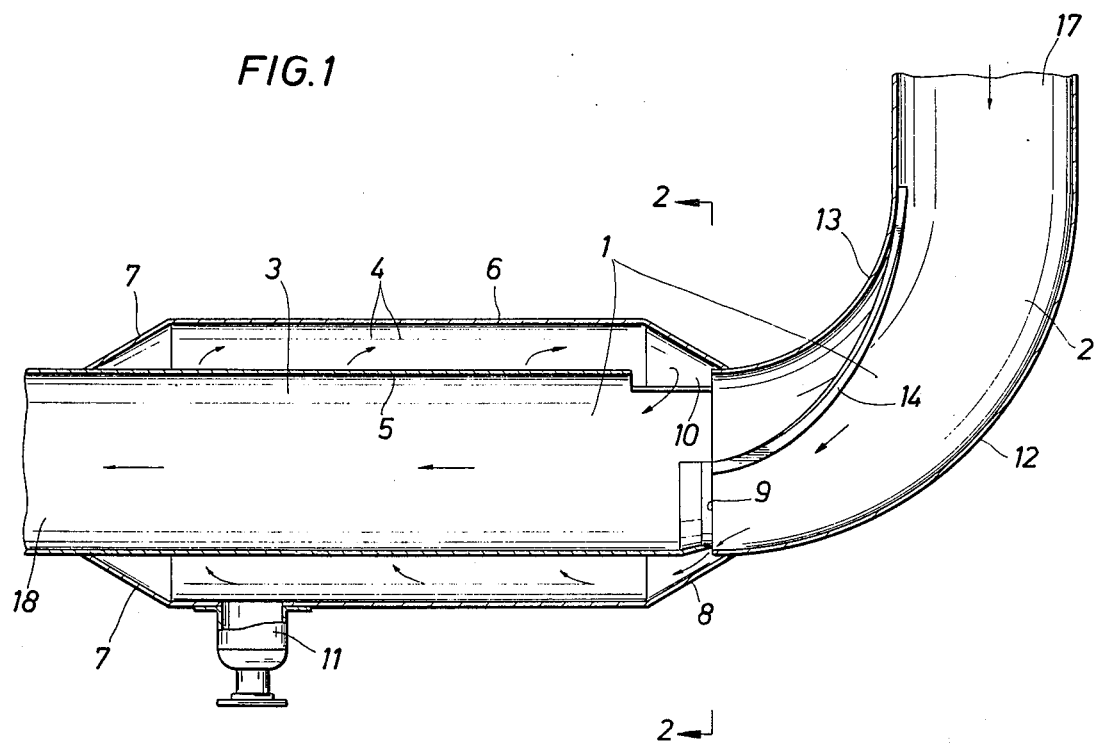
FIG. 1 shows a longitudinal section of an embodiment of the gas/liquid separator according to the invention.
Figure 2:
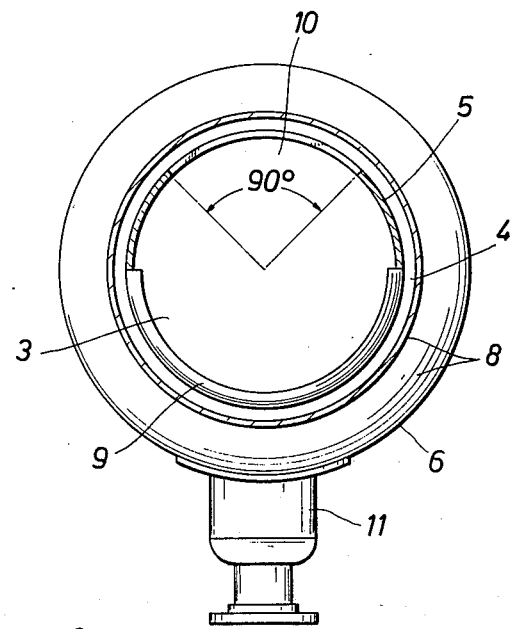
FIG. 2 shows a cross-section according to plane II—II of the embodiment of FIG. 1.

The separator comprises a tubular fluid conduit, pipe section or channel 1. The channel 1 comprises a curved part 2 and a straight part 3, each being circular in cross-section. A liquid collecting chamber 4 is arranged coaxially around the straight part 3. The cylindrical wall 5 of the straight part 3 forms the inner wall of the liquid collecting chamber 4. The outer wall of the liquid collecting chamber 4 comprises a cylindrical part 6 which is coaxial with the cylindrical wall 5. At its ends the cylindrical part 6 is connected to the wall of the fluid channel 1, as by means of hollow frusto-conical elements 7 and 8. At the downstream end of the curved part 2 a liquid outlet 9 is arranged between the fluid channel 1 and the liquid collecting chamber 4, preferably near the upstream end thereof. Furthermore, at the downstream end of the curved part 2, a gas discharge 10 is arranged between the liquid collecting chamber 4 and the fluid channel 1 for returning separated gas at the top of chamber 4 to the flow stream in channel 1. The liquid collecting chamber 4 is provided with a liquid discharge 11.

Figure 3:
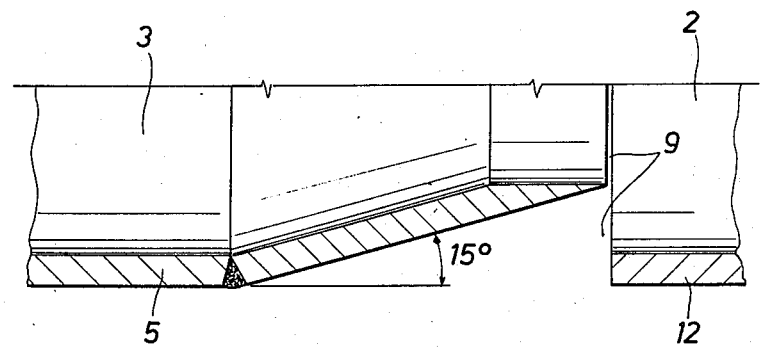
FIG. 3 shows a fragment of liquid outlet 9 of FIG. 1 on an enlarged scale.

The liquid outlet 9 is located mainly at the side of the outer wall 12 of the curved part 2 and the gas discharge 10 is located mainly at the side of the inner wall 13 of the curved part 2. The liquid outlet 9 is in the shape of a slit, as shown, extending, for example, over a distance of about 180°. As shown in FIG. 3, the inner wall 5 may be raised, say 15°, to form a lip at the liquid outlet 9. The lip, being of a diameter less than part 3, forms a raised edge of liquid outlet 9.

In the curved part 2 a pair of gutters 14 is present arranged as clearly shown in FIGS. 4, 5 and 6. Each gutter, which has a downwardly-directed opening, extends along the inner surface of the wall 13, 12 of the curved part 2, each gutter 14 beginning near the inner wall 13 of the curved part 2 and debouching into the liquid outlet 9. The gutters 14 of said pair are symmetrically arranged with respect to the plane 15 containing the centre line of the curved part 2 (see FIG. 5). Each gutter 14 comprises an angle iron continuously welded to the wall of the curved part 2.

The operation of the gas/liquid separator according to the invention is as follows.

Fluid consisting of gas carrying liquid particles enters the curved part 2 of the tubular fluid channel 1 at 17 and flows into the direction indicated by the arrows. Because of the action of centrifugal forces liquid will move outwardly and will concentrate along the inner surface of the outer wall 12 of the curved part 2. This liquid is "shaved off" the inner surface of outer wall 12 by the lip of outlet 9 and passes together with some gas through the liquid outlet 9 and enters the liquid collecting chamber 4. The liquid collects in the lower parts of the liquid collecting chamber 4 and is removed via the liquid discharge 11. The gas leaves (see arrows) the liquid collecting chamber 4 via the gas discharge 10 and enters the tubular fluid channel 1 where it mixes with the main stream of fluid flowing through the straight part 3 of the tubular channel 1. The fluid leaving the separator at 18 consists of gas carrying a quantity of liquid which is reduced as compared with the fluid entering the separator at 17.

If it is desired to reduce further the quantity of liquid present in the gas, the fluid can be passed again through one or more gas/liquid separators similar to the separator as described above and located downstream thereof.

The gutters 14 as shown collect liquid flowing along the wall 13 and guide or direct such liquid to the liquid outlet 9 so that said liquid passes through said outlet 9 and is collected in the liquid collecting chamber 4 as well. The efficiency of the gas/liquid separator is raised substantially by use of the gutters 14.

It is remarked that in the above the expression liquid particles comprises as well solid particles surrounded by a layer or film of liquid (such as for example wetted dust particles).

In tests run to test the apparatus, the efficiency with which water was removed from a flowing air and water stream varied from 80% to 90% over a wide range of flow rates. The use of two separator bends arranged in series with efficiencies in this range is generally adequate for separating liquid from compressor recycle gas in an LNG plant.

We claim as our invention:

1. A gas/liquid separator comprising a substantially horizontal tubular conduit forming a fluid channel having a curved fluid entry portion, a concentric tubular member surrounding and in spaced relationship to an elongated portion of said horizontal tubular conduit forming an elongated annular liquid collecting and separation chamber with means closing the ends of said annular chamber, a liquid outlet forming port means in communication between the tubular fluid channel and the liquid collecting chamber near the downstream end of said curved portion, a liquid discharge secured to the liquid collecting chamber, and a gas discharge port in communication between the upper portion of the annular liquid collecting chamber and the upper portion of the tubular fluid channel at the upstream end thereof, the gas discharge port being arranged near the downstream end of the curved part, and at least one gutter extending along the inner surface of the wall of the curved part of the tubular fluid channel, said gutter beginning near the inner wall of the curved part and debouching into the liquid outlet for directing liquid to said outlet.

2. The gas/liquid separator as claimed in claim 1, wherein a pair of said gutters is present within the curved part of the tubular fluid channel.

3. The gas/liquid separator as claimed in claim 2, wherein the gutters of said pair are symmetrically arranged with respect to the plane containing the centre line of the curved part.

* * * * *